Feb. 18, 1947.  R. W. CLARK  2,415,868
TIMING MODULATION
Filed Oct. 28, 1942

INVENTOR
ROBERT W. CLARK
BY H. S. Grover
ATTORNEY

Patented Feb. 18, 1947

2,415,868

UNITED STATES PATENT OFFICE 2,415,868

TIMING MODULATION

Robert W. Clark, Teaneck, N. J., assignor to Radio Corporation of America, a corporation of Delaware Application October 28, 1942, Serial No. 463,587

13 Claims. (Cl. 179—171.5)

This application concerns a new and improved means for generating and wave length modulating wave energy. The system disclosed is particularly adapted to the generation and modulation of wave energy of higher frequencies, such as, for example, wave energy the mean carrier frequency of which is of the order of 100 to 500 megacycles.

By the expression "timing modulation" applicant means modulation of the instantaneous frequency of wave energy. More specifically, the modulation may be of phase or of frequency, or modulation having the characteristics of both or either depending on the treatment of the currents or potentials used in the modulation process.

In describing my invention, reference will be made to the attached drawing, wherein Figures 1 and 2 each illustrates somewhat diagrammatically wave length modulation systems arranged in accordance with my invention.

Figure 1:
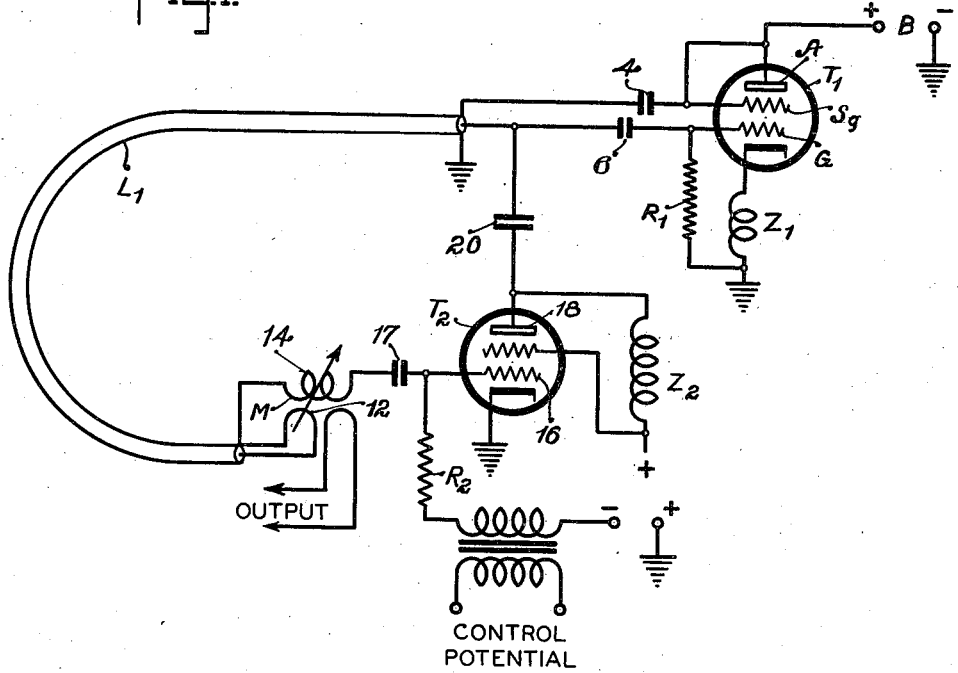

In Figure 1 the generator is of the single tube type as is the reactance tube modulator.

Figure 2:
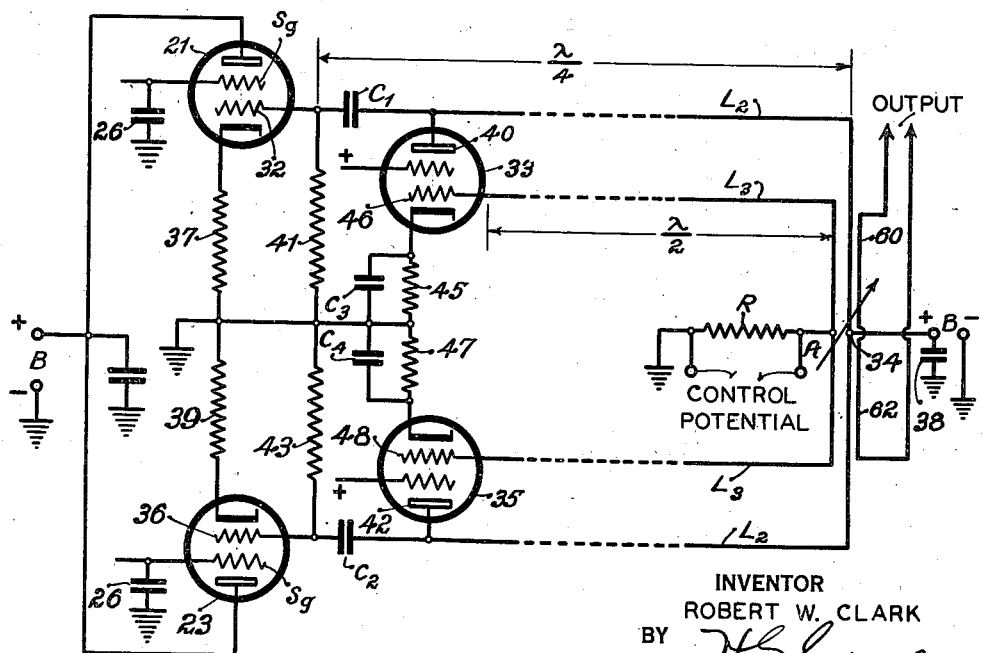

In Figure 2 a push-pull generator and two-tube reactance tube arrangement is illustrated.

In Figure 1 the tube T1 has its anode A and screen grid Sg tied together and coupled by a condenser 4 to ground and to the grounded side or conductor of the line L1. The other conductor of the line L1 is coupled by coupling condenser 6 to the grid G of tube T1, this grid being also connected to ground by a biasing resistor R1. The cathode is connected to ground by an impedance Z1, which is in effect a radio-frequency choke, but in any event must be of considerable impedance at the frequency of operation of the generator. The generator might be said to be a modified Hartley oscillator with the anode and grid at phase opposed potentials of the generated frequency and the cathode at a high potential of a phase intermediate of the phases of the anode and grid potentials.

The line L1 has a length substantially $\lambda/4$, and may be a section of a concentric transmission line providing the oscillator tuned circuit. The line L1 with its end capacity, which includes the capacity of the tube and apparatus across the line, determines primarily the frequency of the oscillations generated.

A loop 12 at the low voltage end of the line L1 is coupled to an inductance 14 connected between the control grid 16 of the tube T2 and ground by way of a coupling condenser 17. The control grid of T2 is connected by biasing resistor R2 to a negative point on a source of potential grounded at a positive point and connected by ground to the grounded cathode. The anode 18 of tube T2 is connected to the high potential side of the line L1 and to the grid G of tube T1 by coupling condensers 20 and 6. Direct current potential is supplied to the anode 18 by a radio-frequency choking impedance or reactance Z2.

The line L1, which as stated above may be about $\lambda/4$ with its distributed capacity and couplings 12 and M, shifts the phase of the voltage which appears on the grid G of tube T1 and the anode 18 of T2 by about 90° when it reaches the grid 16 of tube T2. As a consequence, the current used by T2 will be 90° out of phase with respect to the voltage on the grid of T1. The coupling M need not be tuned to resonance, but may be tuned approximately to resonance for narrow band operation. Since the line L1 is $\lambda/4$, there is a phase shift between the oscillator grid G end of the line and the reactance tube end of the line, at loop 12, of about 90°. In obtaining this desired shift, the length of the line plus its distributed capacity and the capacity of the tubes T1 and T2 elements, the frequency generated and constants of the couplings 12 and M must be taken into consideration in dimensioning the line.

With a phase quadrature relation between the voltages on the grid 12 and the anode 18 of the tube T2, the current through the tube lags or leads the voltage on the anode 18 so that there is produced in tube 18 in a well known manner a reactive effect and this reactive effect is in shunt to the line circuit L1 in the form of a lumped reactance. This reactance, as a consequence, determines in part the frequency of the oscillations generated.

By modulating or varying the current through the tube T2 the reactive effect and the instantaneous frequency of the oscillations generated is modulated. The current in tube T2 may be controlled in accordance with control currents or signals of any type. The control voltages or currents may be applied to any electrode, such as, for example, the control grid 16 or the screen grid, or the anode, or the cathode, by raising the same above ground modulation potential frequency. In the arrangement shown, the control or modulation potential is applied to the control grid 16.

With the coupling M polled in one direction, the phase of the voltage on the grid 16 will be, for example, retarded with respect to the voltage on the anode 18 and the reactive effect will be predominantly inductive. If the polarity of M is then reversed, the phase of the voltage on the grid 16 will lead the phase of the voltage on the anode 18, and the reactive effect will be predominantly capacitive. If the reactance tube is absent, the oscillator is at frequency say $f0$. When the reactance tube is connected and the voltage on its grid lags the voltage on oscillator grid, the effect of the reactance tube is to be a parallel inductance (across the tank circuit) and raise the frequency $(f0+f1)$. But the lumped capacity of the anode of the reactance tube will lower the frequency (being in parallel with the tank circuit). This may be more than the other effect.

Then the mean frequency of operation of the generator system will be lower than it would be in the absence of the reactance tube. If the polarity of M is reversed so that the phase on the grid 12 is relatively advanced, this alters the nature of the reactive effect and the mean frequency of operation is changed. Reversing the polarity of the coupling changes the frequency of operation of the carrier about a mean value.

Z2 is an impedance which supplies plate direct-current and blocks generated voltages from the plate supply source. I may put a blocking condenser in the ground side of the loop 12 and feed the direct-current for the anode of tube T2 through the high side of line L1, thereby eliminating the blocking condenser 20 and impedance Z2.

The output may be taken from the loop 12 by coupling thereto a small loop feeding the load as shown. Furthermore, the output may be taken from the anode A which is then disconnected from the screen grid Sg and ground and is electronically coupled to the generating electrodes and circuits wherein the screen grid acts as the anode. When pentode tubes are used, a section of a transmission line $\lambda/4$ may be connected to the anode of T1 and the load taken from this line.

In the modification of Figure 2 a method of coupling is used which overcomes the limitations of the coupling loop of the modification of Figure 1. While in Figure 2 I have shown a push-pull oscillator, it may also be used single-ended as in Figure 1.

In the arrangement of Figure 2, the oscillation generator comprises a pair of tubes 21 and 23 having their anodes tied together and connected to a source of potential. The screen grids Sg are connected to ground by condensers 26 for oscillations of the generated frequency and serve as anodes in the generator illustrated. The control grid 32 of tube 21 is connected by a line L2, the length of which is about $\lambda/4$ to a point of symmetry 34, while the control grid 36 of tube 23 is coupled by a similar line L2 of the same length to the point 34. The point 34 is coupled to ground by a radio-frequency bypassing condenser 38. This is the oscillator tuned circuit and may consist of parallel rods or plates 90 electrical degrees in length.

The anodes 40 and 42 of tubes 33 and 35 are connected to the grids 32 and 36 by coupling condensers C1 and C2. A second ½ wave length section of transmission line is coupled to the low voltage end of L2 and leads to the grids of tubes 33 and 35. More in detail, control grid 46 of tube 33 is coupled by line L3 to the control grid 48 of tube 35. The line L3 is coupled symmetrically at a point equally spaced electrically from the grid ends of the line to the line L2. As stated above, this line, taking into account end capacities, etc., is $\lambda/2$ in length, i. e., of a length to produce an 180° phase shift. The line should return to the reactance tube grids in such a manner that the only coupling to the tank circuit L2 is at the point previously indicated.

The cathodes of tubes 21 and 23 are raised above ground alternating current potentials by impedances 37 and 39. The control grids 32 and 36 are connected to ground by biasing resistors 41 and 43, while the cathodes of the tubes 33 and 35 are connected to ground by resistors 45 and 47 shunted by radio-frequency bypassing condensers C3 and C4.

Plate potential is supplied to the anodes 40 and 42 of tubes 33 and 35 from a source connected at the point 34, while the grids 46 and 48 are connected to ground by biasing resistor R.

Oscillations are generated due to the fact that the screen grids Sg of tubes 21 and 23, which act as the anodes, are of ground radio-frequency potential, while the control grids 32 and 36 are coupled by two-quarter wave length lines L2 so that the voltages of the generated frequency are in push-pull on the grids and the cathodes are of high radio-frequency potential by virtue of the impedances 37 and 39.

The leads between the anode 40 of tube 33 and grid 32 of tube 21 and the anode 42 of tube 35 and grid 36 of tube 23 are made short so that the line L2 is the primary tuning element to thereby primarily determine the frequency of the oscillations generated disregarding, for the time being, the effect of the reactance tubes 33 and 35 and their couplings.

Since the point 34 is a low voltage point in the generator system, the current here is high and induces opposed voltage in the line L3 at a point intermediate the grids 46 and 48. These voltages are fed by the half wave length line to the grids 46 and 48 in push-pull relation so that although the lines shift the voltages by 180°, the voltages on the grids of the reactance tubes T2 and T4 are still in push-pull relation.

Since the voltages at the point 34 are 90° out of phase with respect to the voltages on grids 32 and 36, which are in turn in phase opposition and the voltages on the anode 40 and 42 are the same as the voltages on the grids 32 and 36, we have in each of the reactance tubes 33 and 35a phase quadrature relation between the anode and grid voltages. Moreover, if the phase on the voltage of the grid 46 of one tube, say 33, leads the voltage on the anode 40 thereof, the phase on the grid 48 of the other tube will lead the phase of the voltage on the anode 42 of the other tube. Likewise, if the phase of the voltage on the grid of one tube lags the phase of the voltage on the anode of that tube, there will be a similar lag in the phase of the voltage on the grid of the other tube with respect to the voltage on the anode of the other tube.

The tubes 33 and 35, therefore, provide in the system similar simulated reactive effects across the tank circuit comprising line L2, thereby controlling the frequency of the oscillations generated. By varying the current through the tubes in phase, the reactive effects are correspondingly varied to thereby vary the frequency of the oscillations generated. In the arrangement shown, I applied the control potentials which may be of any nature at the point A, that is, across the resistor R.

If the simulated reactances provided by tubes 33 and 35 are predominantly inductive crossing the connections of the $\lambda/2$ line L3 to the grids 46 and 48 reverses the phase of the induced voltages and causes the grid voltages to lead the anode voltages so that the reactive effects become predominantly capacitive.

The output may be taken from the anodes of tubes 21 and 23 and coupled into a load by separate λ/4 lines connected to the anodes. In this case, the anodes may be coupled electronically to the generating electrodes and circuits. Moreover, the anodes may be connected by a λ/2 line with loops coupling the latter line to the load circuit. In the arrangement shown, the output is taken by couplings 60 and 62 to the λ/4 line L2.

Modulation may be applied in parallel to the screen grid electrodes of tubes 33 and 35 or on the cathodes in place of on the grids as shown.

The length of line L3 is adjusted to give maximum frequency deviation. It may be somewhat different from exactly λ/2 due to capacities of the tubes and also that a voltage must be on the reactance tube.

The line L3 may be in practice made of a line less than λ/2 and then shunted by series tuning condensers to adjust the resonance of the line. This eliminates the necessity of exact dimensioning of the line.

The push-pull arrangement of Figure 2 may be changed to a single generator tube and reactance tube arrangement by removing, say tubes 23 and 35, and the lines coupled thereto.

What is claimed is:

1. In a simulated reactance, a line wherein wave energy appears, a tube having an anode coupled to said line at a point whereat a wave voltage of a first phase appears, said tube having a cathode coupled to said line to include the internal impedance between the anode and cathode of said tube in circuit with said line and a coupling between the grid of said tube and said line such as to supply to said grid a wave voltage displaced in phase about 90° with respect to the voltage on the anode of said tube whereby a reactive effect is produced in said tube.

2. A wave length controlling system including an arrangement as recited in claim 1 and connections for varying the conductance of said tube in accordance with control potentials to correspondingly vary said reactive effect, the electrical dimensions of said line and the length of said wave energy.

3. In a simulated reactance, a line wherein wave energy appears, the length of said line being about λ/4, a tube having an anode coupled to said line whereat a wave voltage of a first phase appears, said tube having a cathode coupled to said line to include the internal impedance between the anode and cathode of said tube in circuit with said line and a coupling between the grid of said tube and said line such as to supply to said grid a voltage displaced in phase about 90° with respect to the voltage on the anode of said tube whereby a reactive effect is produced in said tube to supplement the reactance of said line.

4. A wave length control system including an arrangement as recited in claim 3 and connections for varying the gain of said tube by control potentials to correspondingly vary said reactive effect, the electrical dimensions of said line and the length of said wave energy.

5. In a simulated reactance, an oscillation generator including a transmission line wherein generated wave energy appears, said line having a length of about λ/4 and terminating in a loop, a tube having an anode coupled to a point on said line whereat a voltage of a first phase appears, said tube having a grid and cathode, a coupling between the cathode of said tube and said line to include the internal impedance of said tube in circuit with said line and an inductance coupling the grid of said tube to said loop to supply to said grid a voltage displaced in phase about 90° with respect to the voltage on the anode of said tube whereby a reactive effect is produced in said tube to supplement the reactance of said line.

6. A frequency modulation system including an arrangement as recited in claim 5, and connections for modulating the conductance of said tube in accordance with signals.

7. In a simulated reactance, a transmission line wherein wave energy flows, said line having a length about λ/4, a tube having an anode coupled to a point on said line whereat a voltage of a first phase appears, said tube having a grid and a cathode, a coupling between the cathode of said tube and said line to include the impedance between the anode and cathode of said tube in circuit with said line and a second transmission line having a length about λ/2 coupling the grid of said tube to said first line said last coupling being arranged to supply to said grid a voltage displaced in phase about 90° with respect to the voltage on the anode of said tube whereby a reactive effect is produced in said tube to supplement the reactive effect of said first line.

8. In a wave length modulation system, an arrangement as recited in claim 7, and connections for varying the gain of said tube in accordance with signals.

9. In a simulated reactance, a transmission line wherein wave energy flows said line having a length about λ/2, a pair of electron discharge tubes each having an anode, a cathode and a control electrode, a coupling between the anode of one of said tubes and one terminal of said line, a coupling between the anode of the other of said tubes and the other terminal of said line, and a coupling between a point intermediate the terminals of said line and the cathode of said tubes whereby the impedance between the anode and cathode of each tube is included in circuit with said line, a second transmission line having a length of about λ connected between the grids of said tubes and a coupling between a section of said last-named line intermediate the ends thereof and a section of said first-named line intermediate the ends thereof.

10. In a wave length control system, an arrangement as recited in claim 9, and connections for varying the conductances of said tubes in accordance with control potentials.

11. In a signalling system, a wave generator including a transmission line wherein wave energy is generated said line having a length about λ/2, a pair of electron discharge tubes each having an anode, a cathode and a control electrode, a coupling between the anode of one of said tubes and one terminal of said line, a coupling between the anode of the other of said tubes and the other terminal of said line, a coupling between a point intermediate the terminals of said line and the cathodes of said tubes whereby the impedance between the anode and cathode of each tube is included in circuit with said line, a second transmission line having a length of about λ connected between the grids of said tubes, a coupling between a section of said last-named line intermediate the ends thereof and a section of said first-named line intermediate the ends thereof, and connections for modulating the conductances of said tubes co-phasially in accordance with signals.

12. In a wave length modulation system, a pair of electron discharge tubes each having an electrode serving as an anode, a control grid and a cathode, a transmission line coupling the control grids of said tubes in push-pull relation, an impedance coupling the cathodes of said tubes to ground, couplings of low impedance to the generated frequency between said electrodes serving as anodes and ground, and connections for energizing the electrodes of said tubes whereby oscillations are generated in said tubes and line, a pair of electron discharge devices having their output impedances coupled in shunt to said aforesaid line, said pair of devices each having a controlling electrode, a transmission line coupling said controlling electrodes in push-pull relation, a coupling between said lines and connections for modulating the currents through said devices.

13. In a wave length modulation system, a pair of electron discharge tubes each having an electrode serving as an anode, a control grid and a cathode, oscillation generating circuits coupled to the electrodes of said tubes said oscillation generating circuits including a line of a length equal to $\lambda/2$ coupling corresponding electrodes of said tubes in push-pull relation and a coupling between a point intermediate the ends of said line and the cathodes of said tubes, a pair of electron discharge devices each having an anode, a cathode and a control electrode, couplings including said line between the anodes of said devices, a coupling between said point and the cathodes of said devices, a line of a length substantially equal to N times $\lambda$ (where N is a whole odd number), a coupling between said control electrodes of said devices, a coupling between a section of said last-named line intermediate the ends thereof and a section of said first-named line intermediate the ends thereof, whereby current is induced in said last line and supplied to said controlling electrodes in push-pull relation and connections for modulating the currents through said devices in accordance with signals.

ROBERT W. CLARK.

REFERENCES CITED

The following references are of record in the file of this patent:

UNITED STATES PATENTS

| Number | Name | Date |
| --- | --- | --- |
| 2,250,104 | Morrison | July 22, 1941 |